Figure 1:
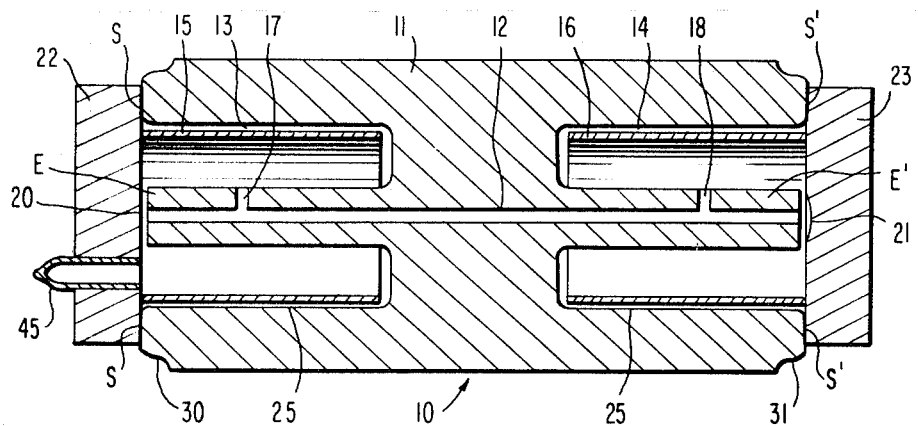

United States Patent [19]
Hochuli

[11] 3,719,900
[45] March 6, 1973

[54] ULTRA STABLE SYMMETRICAL LASER STRUCTURES

[76] Inventor: Urs E. Hochuli, 7011 Southwark Terrace, Hyattsville, Md.

[22] Filed: May 19, 1971

[21] Appl. No.: 144,972

[52] U.S. Cl. ................331/94.5, 330/4.3, 350/161
[51] Int. Cl. ............................................H01s 3/02
[58] Field of Search .......331/94.5; 330/4.3; 313/220; 220/2.1 R; 174/50.61, 50.63, 50.64, 52.5 S; 29/489; 350/161

[56] References Cited

UNITED STATES PATENTS

| 3,619,032 | 11/1971 | Reizman | 350/285 |
|---|---|---|---|
| 3,566,302 | 2/1971 | Rhodes | 331/94.5 |
| 3,528,028 | 9/1970 | Baird | 331/94.5 |
| 3,517,279 | 6/1970 | Ikeda et al. | 317/234 |
| 3,568,088 | 3/1971 | Dessus | 33/194.5 |
| 3,480,348 | 11/1969 | Preston, Jr. | 350/161 |
| 3,479,109 | 11/1969 | Preston, Jr. | 350/161 |

Primary Examiner—William L. Sikes
Attorney—Beveridge & De Grandi

[57] ABSTRACT

There is disclosed a highly stable symmetrical gas laser structure in which ultra stable materials are used in the fabrication. There is also disclosed a system for minimizing length changes due to temperature variations. A method of adjusting, detuning for example, the frequency is also disclosed.

6 Claims, 2 Drawing Figures

INVENTOR
URS E. HOCHULI
BY Beveridge & DeGrandi
ATTORNEYS

ULTRA STABLE SYMMETRICAL LASER STRUCTURES

The present invention relates to gas laser devices having a one piece main body element constructed of ultra stable material. The body member is an elongated, low expansion material and has a central axial discharge bore extending from one end thereof to the other to form the laser cavity. The body has a pair of annular electrode chambers formed therein which are concentric with and symmetrically disposed about the axial bore and these electrode chambers are substantially coterminous with the bore. In each electrode chamber there is an annular electrode which is preferably of beryllium or an alloy thereof but may be zirconium, thorium, titanium and alloys thereof or other long lasting electrode material. Conventional laser mirrors, polarization dependent elements such as Brewster angle windows etc. may be formed on or carried by end blocks or pieces of the ultra stable material of which the body member is formed and joined thereto preferably in the sealing manner disclosed in my application, Ser. No. 60,401 filed Aug. 3, 1970.

The frequency, for detuning purposes, may be adjusted by adjusting the length of the laser cavity by physically translating one of the mirrors thereof. In the past this has been done by piezoelectric crystals, and or physically adjusting the same using an expansible bellow to maintain the gas in confinement. However, in accordance with a modification of the present invention one of the laser mirrors is formed on a thin membrane. A first electrode on the surface of the membrane opposite the surface on which the mirror is formed is in a small cavity or space opposite a rigid electrode support member, made of ultra stable material, carrying a second electrode. A voltage is applied to the pair of electrodes to thereby electrostatically translate the membrane and mirror carried thereby in a direction and amount corresponding to relative magnitude of the voltage applied to the electrodes on the membrane and on the fixed support.

Figure 2:
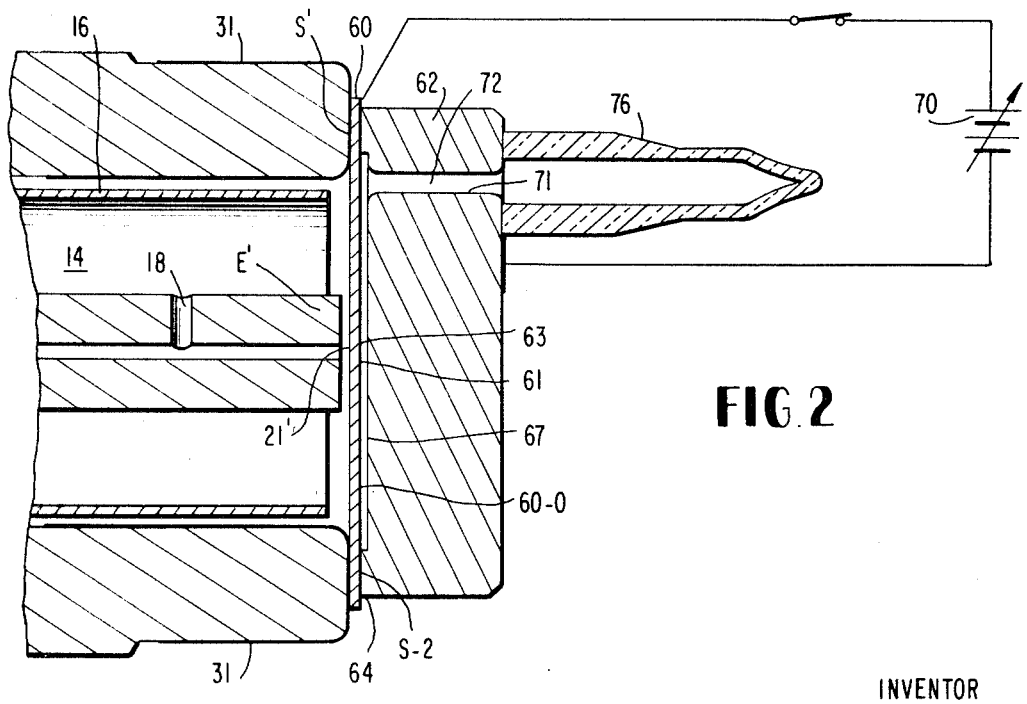

The invention will be described more fully with reference to the drawings in which FIG. 1 shows an ultra stable symmetrical gas laser incorporating the invention and FIG. 2 is a modification thereof showing an electrostatic length transducer for use with the embodiment shown in FIG. 1.

Referring now to FIG. 1, the laser structure 10 includes a main body member 11 which, in a preferred embodiment of the invention is formed from ultra stable materials such as the materials marketed under a trademark Cer-Vit by Owens-Illinois, Inc. of Toledo, Ohio and the trademark ULE by the Corning Glasswork of Corning, New York. Body member 11, in its preferred form consists essentially of a single casting of such ultra stable materials. A central axial bore 12 is drilled along the central axis of body member 11. A pair of electrode chambers 13 and 14 are bored to be symmetrical about the bore 12. Inserted in bores 13 and 14 are a pair of similar electrodes which are cylindrically shaped beryllium electrodes. Although other electrode materials and forms may be inserted in the chambers it is preferred that the electrodes be likewise symmetrical with respect to the axis of bore 12 and that the electrode chambers be isolated from the bore 12 so as to avoid electrode contamination of the lasing section of the cavity. Small transverse bores 16 and 17, respectively, communicate the axial bore 12 with electrode chambers 13 and 14 respectively.

As is usual in such laser structures, a pair of mirror members 20 and 21 are provided. In accordance with the present invention, such mirrors 20 and 21 are suitably formed on a pair of sealing blocks 22 and 23, respectively, such blocks 22 and 23 being composed of the same ultra high stable materials as body member 11. The joining and sealing of such materials having very low thermal expansion coefficients, are preferably accomplished in accordance with my patent application, Ser. No. 60,401. In accordance with the disclosure of my above-identified patent application, reliable extremely thin gold-indium alloy seals for periods of times far in excess of 10,000 hours are now available.

The most severe requirement for stable frequency laser structures is the constant mirror separation and this is accomplished by providing extremely thin and stable seals. As disclosed in detail in my above-identified patent application, the hermetic seal between the mirror support members 22 and 23 and the ends of the laser body member 11 are formed by having smooth perimetrical abutting surface configurations on the members corresponding to the seal and apply, by capillary action, a thin layer of substantially pure indium metal for a thickness of about 5 microns. One of the surfaces may be coated with gold and the other of the surfaces coated with a metal selected from the group consisting of gold, copper, silver, platinum and invar. For example, the surface in the electrode chambers may be gold which extends through the seal area S to shoulder 25 so as to form a convenient current lead to the electrode in the chamber. The seals S and S', per se, even being of a very short length, under about 5 microns, do have some small temperature expansion and are influenced slightly by the pressure differential. The gold coating 30 and 31 used in the forming of the seals at S and S', respectively, may be used as current conductors to the electrodes 15 and 16 in electrode chambers 13 and 14, respectively. As shown, a gas filling tubulation 45 is provided for vacuum bakeout procedures and for filling the assembly with a desired operating gas. Such a gas may be a mixture of helium, neon and a small amount of hydrogen; carbon dioxide and various other gases well known in the art.

The one piece body member 11 greatly simplifies the structure of such devices and by providing this symmetrical electrode arrangement, the device is easily adapted to direct current, alternating current or RF gas discharge. As is known, the choice of excitation influences the life, noise and cataphoresis effects in the gas discharge. The main body, by being one piece, and having a large mass of glass in the center thereof can be suspended in the center region with a minimum of interference from the support. Heat generated in the free end portions E and E' of the body portions surrounding the axial bore are conveyed to the central portion of the main body. The arrangement of the electrodes in chambers 13 and 14 with the coupling through ports 17 and 18, respectively, protect the mirrors. It will be appreciated that the mirrors may be arranged at Brewster angle or that Brewster angle windows may be incorporated in the device without departing from the spirit and scope of the invention as described thus far. Such windows may be incorporated at the free end portions E and E' containing discharge bore 12. Moreover, a pin electrode may be incorporated at one end of the assembly. Thus, instead of constructing a pair of chambers such as chambers 13 and 14, one of ports 17 or 18 may be inclined at an angle with a pin electrode (not shown) therein. Such electrodes have small chambers with small electrode surfaces so as to reduce the capacitance. This pin electrode type structure, while not shown, may also incorporate a preferred embodiment of the invention utilizing at one end the symmetrical structure described herein.

TEMPERATURE COMPENSATION

The ultra stable materials described above are materials with nonlinear thermal expansions. A parabolic law of the form $\Delta L/L = \alpha(T-T_o)^2$ (1) represents a fairly good approximation for their thermal behavior over the temperature range of interest with $$\left. \begin{array}{l} \alpha = 8 \cdot 10^{-10} \, (°K)^{-2} \\ T_o = -10°C \end{array} \right\} \text{for ULE and (2)}$$

$$\left. \begin{array}{l} \alpha = 6 \cdot 10^{-10} \, (°K)^{-2} \\ T_o = -40°C \end{array} \right\} \text{for CER-VIT (3)}$$

In an ideal situation it is preferred to work exactly at $T_0$ in order to minimize length changes due to temperature variations but this is not always possible because of the thermal expansion of the seals S and S', the influence of the the pressure etc. These expansions vary however mostly linearly with the temperature.

An expansion of the parabolic law around a new working temperature temperature $T_1$ $$\Delta L/L = \alpha\{(T_1-T_o)^2 + 2(T_1-T_o)\Delta T + (\Delta T)^2\} \quad (4)$$

shows that within reason one can always compensate for such a linear expansion term by a proper choice of $T_1$. The compensated structure behaves thermally the same way as an ideal one working at $T_0$ namely $$\Delta L/l = \alpha(\Delta(T_1)^2$$

Thus by choosing $T_1$ to satisfy (4) above the adverse effects of variations in length due to the different expansion properties of the material of the body member and seals is minimized.

Referring now to FIG. 2, there is shown a preferred method of electrostatically changing the length of the assembly. In the past, piezoelectric transducer where used for the purpose of adjusting the laser cavity length. Commonly used piezoelectric materials are not very stable and reproducible, show hysteresis effects or their thermal expansion coefficient are too large to match with the ultra stable materials disclosed herein. Hence in accordance with the present invention except for the seals S and S', the same ultra stable material is used throughout the assembly (the vacuum bake-out and gas filling tubulations may be quartz, pyrex etc.) and electrostatic force instead of the piezoelectric effect or mechanical transducers is used to produce a selected or controlled change in the length of the laser cavity. Thus as shown in FIG. 2, in place of a solid end block 23, the unit includes a membrane 60 formed of the same material as body member 11, having a laser mirror 21' formed thereon and sealed to the end of body member 11 as at S' in the manner described in my above-mentioned patent application. On the opposite side 60–0 of membrane 60 is formed an electrode 61 to form one side of a capacitor. Block 62 has a small cavity 63 formed therein with an annular rib or shoulder 64 sealingly joined to membrane 60 as in my above-identified patent application. The capacitor electrode 61 may be one of the sealing elements for forming the hermetic seal at S-2. The other electrode or capacitor plate 67 is formed on the inside surface of cavity 63 and is spaced from electrode 61 about 0.1 mm. This electrode 67 is plated gold and its connection to external voltage supply 70 is by conductive plating 71 extending through bore 72 which leads to a vacuumization tubulation 76. About 2,000 volts are required for a length change corresponding to a frequency of about 1,500 MHz. To avoid breakdown of the 0.1 mm gap the vacuumization of cavity or chamber 63 should be to $10^{-6}$ torr or better.

The above description of the invention is merely exemplary and various modifications may be incorporated without departing from the spirit and scope of the invention as set forth in the claims appended hereto.

I claim:

1. Gas laser apparatus comprising,
   an elongated non-conductive, one piece body member of low expansion material, said body member having a central axial bore extending from end to end thereof, said body member being symmetrical about said axial bore,
   said body member having at least one annular electrode gas-reservoir chamber formed therein and said annular electrode gas-reservoir chamber being concentrically disposed about said bore and in communication therewith, said bore being substantially coterminous with said electrode gas-reservoir chamber,
   an annular electrode in said electrode gas reservoir chamber and surrounding said bore, and a cooperating electrode at the opposite end of said body member,
   a laseable gas composition in said bore and said electrode gasareservoir chamber,
   a pair of mirrored plate members,
   means sealingly joining said plate members to said body member with said mirrors at the ends of said bore, respectively, to constitute a laser cavity, and
   means for making electrical connection to said electrodes for supplying operating potentials thereto.

2. The gas laser apparatus defined in claim 1 wherein said elongated body is a single integral unit having essentially zero expansion and at least one of said mirrored plates is transparent and made of material having essentially zero expansion.

3. The gas laser apparatus defined in claim 2 wherein said means sealingly joining said plate member to said body member includes a thin gold-indium alloy annulus between the abutting surfaces of said body member and said mirrored plate member, said annulus being about 5 microns thick.

4. In a method of operating a gas laser structure having an elongated body member of low expansion material, a central bore in said body member, and a pair of plate members forming a laser cavity with said bore, and gold-indium alloy means sealingly joining said plate members to said body member, said method including the step of maintaining the ambient temperature of said structure at a temperature $T_1$ such that $$\Delta L/L = \alpha\{(t_1-T_o)^2 + 2(T_1-T_o)\Delta T + (\Delta T)^2\}$$

where L is the longitudinal length of the assembly, $\Delta L$ is the change in length due to temperature change, $\alpha$ is the thermal coefficient at $T_o$ and $\Delta T$ is the change in temperature about the operating temperature $T_1$.

5. The invention defined in claim 1 including electrostatic force producing means for shifting one of said mirrors along the axis of said laser cavity including a stationary electrode member having a first planar electrode thereon, a membrane closing one end of said bore and on which one of said mirrors is formed, and a further planar electrode on said membrane, and means applying a D.C. voltage to said planar electrodes.

6. A symmetrical gas laser body member having an axial bore therein, first and second electrode cavities, each formed in an end of said body member concentrically and symmetrically about a terminal end, respectively, of said bore, and transverse passageways respectively, in said body member connecting said bore with said electrode cavities, respectively, said body member being a single block of a low expansion material.

* * * * *